United States Patent [19]

Bennett

[11] Patent Number: 5,141,307
[45] Date of Patent: Aug. 25, 1992

[54] SURVEYING METHOD

[76] Inventor: Michael L. Bennett, Summer Fields Sketty Road, Swansea, United Kingdom

[21] Appl. No.: 622,815

[22] Filed: Dec. 5, 1990

[51] Int. Cl.⁵ .................. G01C 3/00; G01B 11/26
[52] U.S. Cl. .................. 356/1; 356/141; 356/152
[58] Field of Search .................. 356/1, 4, 5, , 152

[56] References Cited

U.S. PATENT DOCUMENTS

| | | | |
|---|---|---|---|
| 3,653,769 | 4/1972 | Albright | 356/141 |
| 3,752,588 | 8/1973 | Chapman | 356/152 |
| 4,025,192 | 5/1977 | Scholostrom et al. | 356/152 |
| 4,355,895 | 10/1982 | Cairns et al. | 356/141 |
| 4,691,446 | 9/1987 | Pitches et al. | 33/516 |
| 4,769,700 | 9/1988 | Pryor | 358/107 |
| 5,022,751 | 6/1991 | Howard | 356/1 |

FOREIGN PATENT DOCUMENTS 2183841 6/1987 United Kingdom .

Primary Examiner—Stephen C. Buczinski
Attorney, Agent, or Firm—David P. Gordon

[57] ABSTRACT

The method, for surveying the surface of a roadway to obtain measurements of level at desired points on the roadway comprises:

setting-up a series of permanent marks spaced-apart from each other along and to one side of the surface to be surveyed;

setting-up an observation station at any desired position within observation distance of at least two of the permanent marks, there being provided a laser-type surveying instrument at the observation station;

carrying out observations of the permanent marks from the observation station and deriving therefrom co-ordinate information concerning the location of the relative positions of the permanent marks and of the observation station; and carrying out observations from the observation station of selected points along a transverse line on the surface and computing therefrom information concerning the levels of the points.

7 Claims, 2 Drawing Sheets

SURVEYING METHOD

BACKGROUND OF THE INVENTION

This invention relates to a surveying method and is particularly, though not exclusively, applicable to the surveying of the surface of an existing roadway in order to obtain measurements of level at desired points on the roadway.

Measurements of level are required at desired points along the line of an existing roadway, which may be subject to undue wear or subsidence following heavy usage, to facilitate calculations being made as to the quantities of surfacing operations. Accurate indications of level will also be required, as reference heights, during the application of subsequent layers of paving material or the like during re-surfacing.

At one time, levelling measurements were carried out by a team of a surveyor operating a surveyor's levelling instrument, and a "chain boy" carrying a measuring staff. By first deriving the level of the instrument from a reference mark, the level of the foot of the staff at any required measurement point can readily be calculated by reading-off the height of the staff as viewed horizontally through the instrument, and then subtracting this reading from the previously derived height of the instrument.

More recently, road surfaces have been measured by observing angles and distances to a retroreflective target. The road surface is normally measured from predetermined co-ordinate positions over a range of 0 to 100 meters. To establish these co-ordinated points, two processes are involved: (a) traversing to establish x-y co-ordinates and (b) levelling to establish z co-ordinates. These points are established typically at 150 meter intervals along the route, so that the entire road surface is within range of at least one point.

However, even with these more modern methods, it is necessary to close-off sections of a roadway e.g. one or more lanes of a motorway or freeway, so that the measurement can be carried out by the operating personnel without risk of being struck by high speed traffic. This involves a high cost of coning-off freeways, with necessary labor costs involved, as well as disruption to the pattern of traffic flow.

Laser-type measuring instruments, have recently been developed which employ low power infra red beams, and permit distance measurements to passive targets such as the road surface itself. However, there is a range restriction on the use of this method on horizontal surfaces to required levels of accuracy, though acceptable results could be obtained in the range 10 to 30 meters from an elevated instrument, using specially developed techniques.

U.K. Patent Specification 2123941A discloses a surveying method which uses a stationary laser light source together with two measuring instruments such as theodolites. The method comprises projecting light from the stationary light source to a point on the road surface; the two theodolites are then aligned with the point and the theodolites readings are taken.

The invention is therefore based on the use of these new style instruments, and enables a surface of a road to be surveyed without retroreflective targets, and from a position at the side of the road which should give rise to large cost savings, and avoidance of the confusion and chaos which normally results from lane closures required by conventional techniques.

OBJECTS OF THE INVENTION

It is an object of the invention to provide an improved surveying method which will enable an entire desired road surface to be surveyed from positions which observe the road surface within the range of 10 to 30 meters from any one position.

It is a further object of the invention to provide a surveying method which establishes known co-ordinated positions so that every point on the road surface is within the above mentioned range.

It is a still further object of the invention to provide a surveying method wherein any point within the above mentioned range can be observed to an acceptable level of accuracy.

SUMMARY OF THE INVENTION

According to the invention, there is provided a method of surveying the surface of a roadway to obtain measurements of level at desired points on the roadway, which method comprises: setting-up a series of permanent marks spaced-apart from each other along and to one side of the surface to be surveyed; setting-up an observation station at any desired position located within observation distance of at least two of the permanent marks, there being provided a laser-type surveying instrument at the observation station; and carrying out observations from the observation station at desired points along a transverse line on the surface and computing therefrom information concerning the levels of the above-mentioned points.

Therefore, by carrying out the surveying method according to the invention, levels can readily be determined at desired points along a series of cross-section lines spaced apart along the length of the surface to be surveyed.

Conveniently, a mobile observation station is provided, in the form of a suitable vehicle, which is adapted to transport an observation module and which will be provided on board with a computer installation which records results for real time computation verification of observations.

The module may take the form of a tripod assembly which can readily be mounted on or in the vehicle, and then dismounted for use at any desired observation position.

To facilitate the observations of the permanent marks, an observation pole may be provided to be mounted replaceably at each mark. The pole may be provided with a pair of longitudinally spaced targets, and each target may include a visual target portion and a reflective target portion. The targets are located at predetermined spacings from each other, and from the base of the pole on the permanent mark, and therefore observations of the pole from the observation station can be carried out and there is no necessity for the pole to be held or mounted accurately vertical, as automatic compensation can be obtained by computation using the dual targets.

BRIEF DESCRIPTION OF THE DRAWINGS

Preferred embodiments of the surveying method according to the invention will now be described, by way of example only, with reference to the accompanying schematic drawings, in which.

DETAILED DESCRIPTION OF PREFERRED EMBODIMENT

Figure 1:
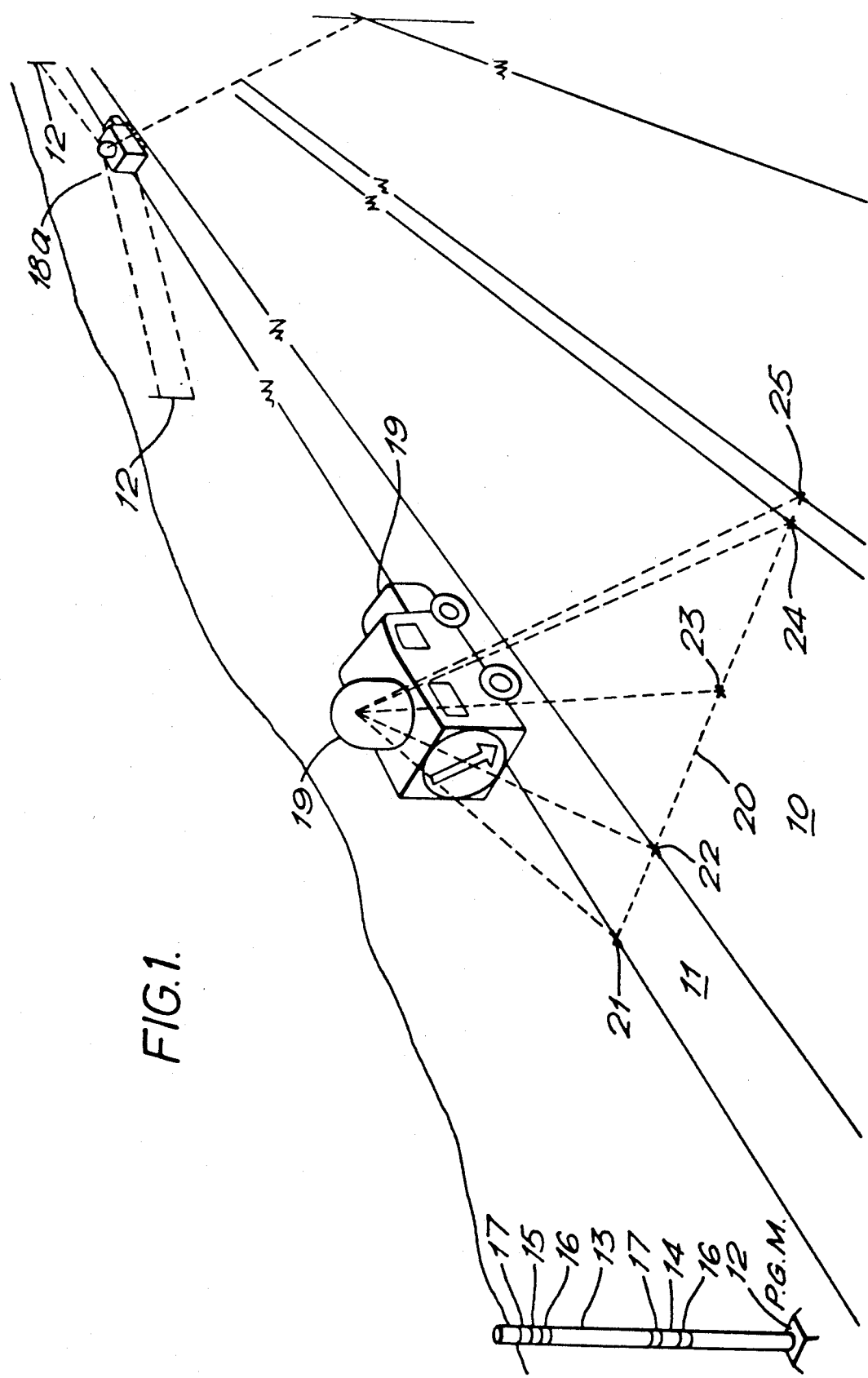
FIG. 1 is an overall view of the method according to the invention.

Referring now to FIG. 1, there is shown an existing surface of a roadway 10, in the form of a pair of lanes of a freeway, and which it will be assumed has undergone undue wear following heavy usage, whereby the surface is tending to crumble, and requires complete re-surfacing. It is therefore necessary for levels to be taken at points along the cross-section of each lane, and for the cross-sections to be taken at spacings apart from each other along the length of the lanes.

Grid reference levels can therefore be determined, and entered into a computer memory, and then used to facilitate calculations being made as to the quantities of materials which may be required in order to carry out re-surfacing operations. Also, accurate indications of level can then be made of the permanent marks, which will serve as reference heights, during the removal of the surface layer and subsequent application of new layers of material during re-surfacing.

To carry out the surveying method, first of all a series of permanent marks are established at approximately 100 meter intervals along the side of the route, conveniently closely adjacent to the hard shoulder or verge 11. There is shown in the drawing a typical one of these permanent marks, designated by reference 12, which is a permanent ground marker (PGM). Each point is marked using a form of retroreflective target, which is designated generally by reference 13. In the illustrated arrangement, the retroreflective target takes the form of a pole which is inserted into the permanent mark 12 so that the centre base of the pole is in contact with the precise point to be co-ordinated. The pole has a pair of targets designated generally by references 14 and 15, which are a fixed distance from each other, and also a fixed distance above the base. Each target 14 or 15 consists of a circular paint mark or tape 16 for optical pointing, and a strip 17 of reflective tape to return a distance measurement. The twin targets achieve two purposes. Thus, by solving the geometry, a check can be made on the consistency of the observation, and the base of the pole in space can be co-ordinated without the need for the pole to be held accurately vertically.

Figure 2:
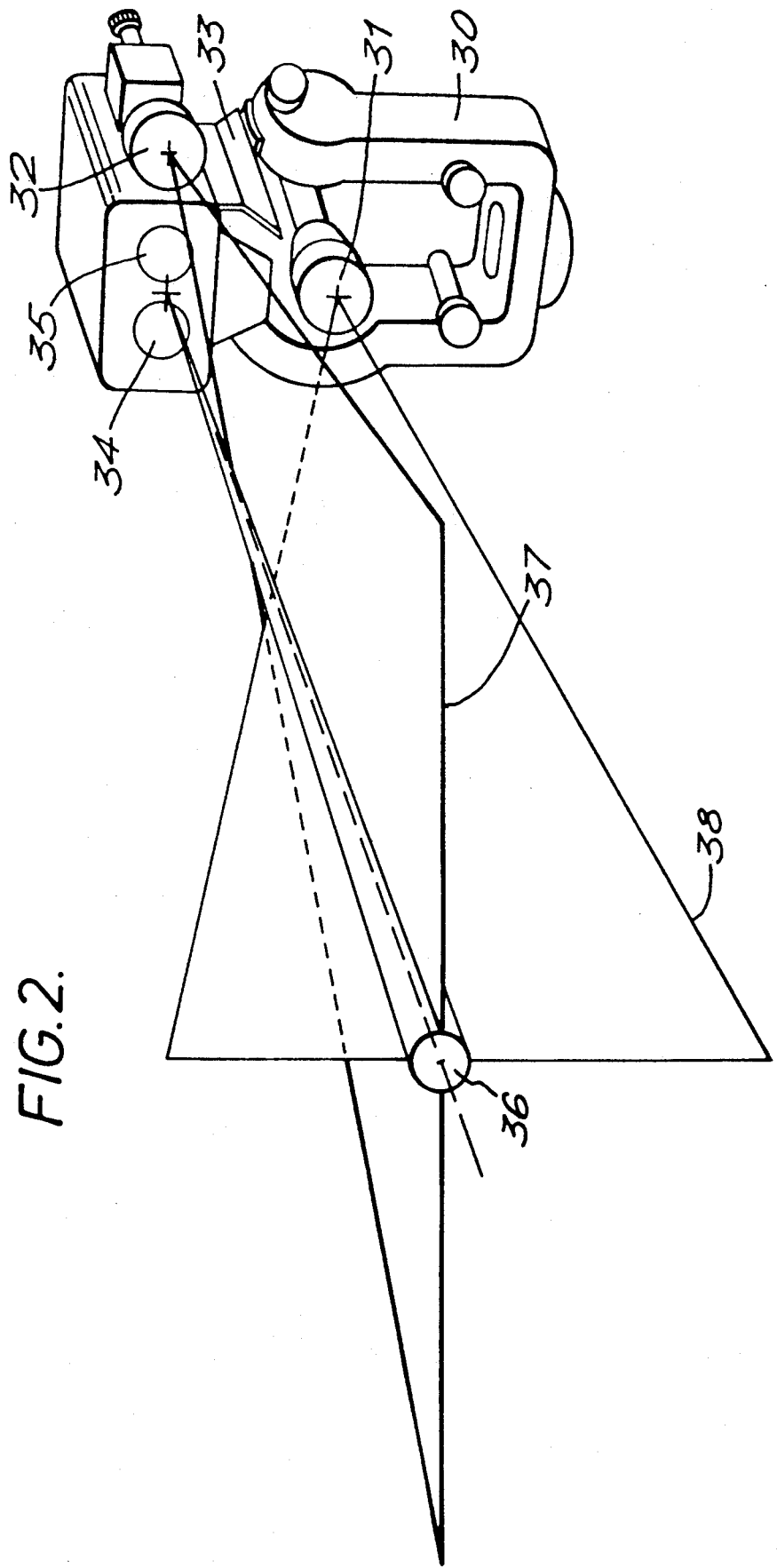
FIG. 2 is a schematic illustration of the apparatus employed within the observation module employed in the arrangement shown in FIG. 1.

A mobile observation work station is provided, which in the illustrated embodiment takes the form of a vehicle 18 which serves for transportation of a detachable observation module 19. Referring to FIG. 2, there is shown a laser theodolite suitable for use in the observation module 19. The theodolite comprises a support frame 30 having mounted thereon a first optical telescope 31 (for defining a vertical plane of the laser beam), a second optical telescope 32 (for defining a horizontal plane of the laser beam), and, on a fixture 33 adjacent to telescope 32, a laser transmitter 34 (comprising the end of a fibre optic wave guide) and an infra-red receiver 35 (again comprising the end of a second fibre optic wave guide).

The laser transmitter 34 is connected by means not shown to a laser source (also not shown) and the receiver 35 is also connected by means not shown to means for processing the incoming signal. The laser transmitter is such that a divergent beam 36 is produced, typically having an angle of divergence of no more than 10 degrees. The respective horizontal and vertical planes of the beam are denoted by reference numerals 37, 38, respectively.

The vehicle 18 can run along the hard shoulder or verge 11, and when it is located at any desired distance from one of the permanent marks 12, the vehicle can then be stopped, and the observation module 19 dismounted and then placed on the ground for surveying operations to take place. The module will be set up and co-ordinated with the adjacent reference mark. Thus, at each observation position along the route, at least the three nearest control points are observed and co-ordinated in a local system which includes the observation position. By providing at least two common control points for observation at each observation position, the co-ordinate system of one can then be transformed to the next. This is done successively throughout the length of the route to be surveyed. By including points of known eastings, northings and height, the final co-ordinate system can be transformed to any co-ordinate system.

During the surveying, some redundant information is observed, and therefore a "best fit" solution is used, whereby a check can be maintained on the consistency of the observations and an indication given of accuracy achieved. It will also give superior results than is achieved by simple traversing and levelling.

However, because of the limited range of direct observations which can be achieved (10 to 30 meters with currently available laser observation instruments), a large number of observation set-ups will be required. To achieve rapid set-up and movement between observation positions, the instrument is therefore mounted on a specially adapted tripod, forming part of module 19, which is fitted inside the vehicle 18 for transportation from one observation position to another. During observations, the observation module can be lowered to the ground, free of the vehicle.

The observations made directly to the road surface rely on a good vertical angle for the required height accuracy. Any error in distance measurement has very little effect on the calculated height accuracy, when vertical angles are small. To improve on distance accuracy to an inclined surface, a series of calibration measurements can be made at the start of each job and applied in turn to each observation.

To do this, the observations are entered directly into a computer which is mounted within the vehicle 18, and this allows quality control to be achieved in the results as they are made, and to apply the relevant corrections and then store them to disc.

An additional facility may be provided in that computation of co-ordinates can be carried out in "real time", to enable specified points to be observed. For example, points at regular chainage intervals can be set out along channel lines, or sections can be observed at right angles to channel lines at predetermined offsets.

Finally, the results can be re-formatted to conform with any clients requirement e.g. MOSS, Integraph and the like.

The surveying method which has been described is particularly suitable for use in measuring levels along cross-sections of the surfaces of existing roadways, and it can be seen from FIG. 1 that measurements can be taken along a transverse grid line 20, at spaced-apart positions 21, 22, 23, 24 and 25. These reference points along the grid line can be observed by direct measurement, and within a calibrated range.

A further position of vehicle 18 is shown further along the route, designated by reference 18a, where further measurements can be carried out as shown schematically by the sighting lines. However, the general principles of the surveying method discloses herein may be applied to other surveying situations, if desired.

While the present invention has been described in terms of a preferred embodiment, various modifications obvious to one with ordinary skill in the art may be made without departing from the scope of the invention, which is defined in the appended claims.

What is claimed is:

1. A method of surveying the surface of a roadway, which method comprises:

setting up a series of permanent marks spaced-apart from each other along and to one side of said surface to be surveyed and at known relative x,y,z coordinate locations;

providing a mobile observation station at any desired position located within observation distance of at least two of said series of permanent marks, said observation station being provided with a laser source and a receiver for receiving reflected laser radiation;

for each roadway surface determination, directing a beam of radiation from said laser source towards said at least two permanent marks;

deriving from radiation reflected from said at least two permanent marks x,y,z co-ordinate information concerning a relative x,y,z location of said observation station relative to the relative known positions of said at least two permanent marks;

directing at a known angle at least one further beam of radiation from said laser source towards a transverse line on said surface;

detecting reflected radiation from selected points on said transverse line by means of said receiver; and computing from the detected reflected radiation from said selected points, information concerning relative x,y,z locations of said selected points.

2. A surveying method acording to claim 1, wherein said observation station comprises a vehicle having thereon an observation assembly comprising said laser source and said receiver, said assembly being demountable from said vehicle.

3. A surveying method according to claim 2, wherein said vehicle is provided with computer means for recording said co-ordinate information.

4. A surveying method according to claim 1, wherein said observations of said permanent marks are carried out using an observation pole replaceably mounted at each said mark.

5. A surveying method according to claim 4, wherein said pole is provided with a pair of longitudinally spaced targets.

6. A surveying method according to claim 5, wherein each said target comprises a visual target portion and a reflective target portion.

7. A surveying method according to claim 5, wherein said targets are located at predetermined relative spacings from one another and from the base of the respective pole.

* * * * *